US005291012A

United States Patent [19]

Shimizu et al.

[11] Patent Number: 5,291,012

[45] Date of Patent: Mar. 1, 1994

[54] HIGH RESOLUTION OPTICAL MICROSCOPE AND IRRADIATION SPOT BEAM-FORMING MASK

[75] Inventors: Isao Shimizu, 2990-3, Nakane, Katsuta-shi, Ibaraki; Seiji Aotani, Yokohama, both of Japan

[73] Assignees: Isao Shimizu, Ibaraki; Japan Synthetic Rubber Co., Ltd., Tokyo, both of Japan

[21] Appl. No.: 872,525

[22] Filed: Apr. 23, 1992

[30] Foreign Application Priority Data

Apr. 30, 1991 [JP] Japan ................................ 3-098897

[51] Int. Cl.$^5$ ................................ H01J 3/14

[52] U.S. Cl. ................................ 250/216; 250/237 R; 359/370

[58] Field of Search .................. 250/216, 237 R, 548; 359/368, 370; 356/400

[56] References Cited

U.S. PATENT DOCUMENTS 3,637,280 1/1972 Beyer et al. ........................ 359/370
4,631,416 12/1986 Trutna, Sr. ........................ 250/548
4,929,083 5/1990 Brunner ............................ 356/400
5,086,222 2/1992 Shibuya ............................ 359/370

OTHER PUBLICATIONS

"Wave Optics", by Hiroshi Kubota, Iwanami Shoten, 1971, pp. 360–363.

Satoshi Okazaki, *O plus E*, "Development of a Fluorescent Method of Near-Field Scanning Optical Microscope and Trial of Application to Bio-observation", No. 118, Sep. 1989.

*Primary Examiner*—David C. Nelms
*Assistant Examiner*—Stephone B. Allen
*Attorney, Agent, or Firm*—Oliff & Berridge

[57] ABSTRACT

A high resolution optical microscope consists of an irradiation spot beam-forming mask which is disposed in a dark or a bright field, whereby a diameter of each of a plurality of irradiation spot beams onto an object to be measured is made smaller than a size of the object, beyond Rayleigh's resolution limit. In the irradiation spot beam-forming mask, a phase array is regularly disposed in a two-dimensional direction so that neighboring portions of each of the irradiation spot beams are optically phase-shifted from one another at 180°. Thus, a wide observation surface and a prompt measurement can be performed with a high resolution of 0.1 μm or less, far beyond Rayleigh's resolution limit.

7 Claims, 9 Drawing Sheets

HIGH RESOLUTION OPTICAL MICROSCOPE AND IRRADIATION SPOT BEAM-FORMING MASK

BACKGROUND OF THE INVENTION

1. Field Of The Invention

The present invention relates to a high resolution optical microscope and an irradiation spot beam-forming mask for the optical microscope, and more particularly to a high resolution optical microscope, wherein an object of a small size of 0.1 μm or less can be observed by a phase shifting mask on which a phase arrangement, each of neighboring portions in the arrangement is optically phase-shifted from one another at 180°, is regularly arranged in the two-dimensional direction, and not only visible rays but infrared rays, ultraviolet rays and X-rays are applicable to the optical microscope as long as the used light beam is coherent.

2. Description Of The Prior Art

Conventionally, in a high resolution optical microscope, typical one of three methods is used: an interference method, a dark field method or a near-field scanning method.

In the optical microscope using the interference method, a resolution in the longitudinal direction, to which an optical axis is parallel, is relatively high, but a resolution in the lateral direction is at most on the order of about 1 μm because a diameter of the irradiation spot beam can not be made small under a diameter of an Airy disk.

In the optical microscope using the dark field method, only an object to be measured (e.g., a contaminant or foreign matter) brightens and image contrast is high. However, it is necessary to completely prevent the illumination light from entering an objective lens, there is such a problem that magnification extremely differs with the size and the direction of the object to be measured.

In the near-field scanning optical microscope (NSOM) using the near-field scanning method, since luminous flux output from a minute pinhole of an optical probe scans an object in the two-dimensional direction within the near field of the object, resolution in the lateral direct-ion is high ("Development of a Fluorescent Method of Near-field Scanning Optical Microscope and Trial of Application to Bioobservation", by Satoshi Okazaki, O plus E, No. 118, Sep. 1989, pp. 110–116) However, it is impossible for some objects to be scanned by the flux in the near field. There are many restrictions on the use because of the receiving of the faint light.

In contrast, a scanning tunneling microscope (STM) with a tunnel electric current has been developed,, and can be expected to measure an object in the unit of atoms. In this microscope, however, it is necessary for a metallic probe to approach a conductive sample as close as 1 nm and to scan a surface of the sample so as to maintain a generated tunnel current constant. As a result, a precision actuator and a sophisticated servo mechanism are required. In addition, the scanning tunneling microscope has such disadvantages that an insulating sample can not be measured, that a wide area (over several tens of micrometers) of a sample can not be consecutively measured, and that a measured absolute value is somewhat unreliable and the like.

The high resolution of 0.1 μm or less can be also obtained by using a scanning electric microscope (SEM). Since, however, an electron beam scans an object in a vacuum, the apparatus is made large and complicated. In addition, the microscope has such a disadvantage that there is a restriction on materials of an object to be measured, for example, a living body can not be measured, and a sophisticated scanning servo mechanism is required because of a single electron beam.

As described above, the resolution or the like is limited in the conventional optical microscopes using the interference method or the dark field method. In the conventional scanning microscope such as the optical microscope using the near-field scanning method, there are such problems that a complicated and expensive servo mechanism or the like is required, and that it is impossible for the scanning microscope to observe a two-dimensional plane surface or a three-dimensional solid surface of a sample without scanning.

SUMMARY OF THE INVENTION

It is a first object of the present invention to provide a high resolution optical microscope which solves the above problems and disadvantages, can observe an infinitesimal object to be measured having a size about 0.1 μm or less in the two-dimensional or three-dimensional direction, and can observe and measure relatively a wide area in the two-dimensional plane surface or the three-dimensional solid surface of the object in a static condition without scanning.

It is a second object of the present invention to provide irradiation spot beam-forming means applicable for the above mentioned high resolution optical microscope.

In order to achieve the first purpose, a high resolution optical microscope according to the present invention comprises irradiation spot beam-forming means, wherein a phase arrangement is regularly arranged in the two-dimensional direction so that each of neighboring portions of a plurality of coherent irradiation spot beams onto an object is optically phase-shifted from one another at 180°, and means for converging the plurality of coherent irradiation spot beams so that a diameter of each of the plurality of coherent irradiation spot beams is made smaller than a size of the object and for illuminating the object by the plurality of irradiation spot beams.

In a first aspect of the optical microscope in accordance with the present invention, the irradiation spot beam-forming means comprises a light source for generating a coherent light, and a mask forming an irradiation spot beam which forms the plurality of irradiation spot beams by transmitting or reflecting the coherent light and is regularly arranged in the two-dimensional direction so that each of neighboring portions of the plurality of coherent irradiation spot beams is optically phase-shifted from one another at 180°.

In a second aspect of the optical microscope in accordance with the present invention, means for illuminating the object is a lens system.

In a third aspect of the optical microscope in accordance with the present invention, the irradiation spot beam-forming mask is disposed either in a bright field position in which the beams pass only once or in a dark field position in which the beams pass twice.

In a fourth aspect of the optical microscope in accordance with the present invention, minimum shifting means for slightly moving or vibrating the lens system in a direction of the optical axis of the lens system is disposed.

In a fifth aspect of the optical microscope in accordance with the present invention, the irradiation spot beam-forming mask is disposed either in a upstream or in a downstream of a half mirror or a beam splitter being placed on an optical path, with respect to the light source, and the object is mounted on a stage which can travel for scanning in the two-dimensional direction or in the three-dimensional direction.

Additionally, in order to achieve the second object, the irradiation spot beam-forming means is an irradiation spot beam-forming mask, which comprises a substrate, and a plurality of phase shifters which are disposed on the substrate in a checkered pattern and optically phase-shift each incident coherent light from one another at 180° and generate a plurality of clearly separated irradiation spot beams onto an object to be measured by transmitting or reflecting the incident coherent light beam.

In the first aspect of the irradiation spot beam-forming mask in accordance with the present invention, the mask is produced by a fabricating process where the phase shifters is formed on the substrate by the microlithography method using a transparent sensitive resin coated on a transparent substrate.

In the second aspect of the irradiation spot beam-forming mask of the present invention, the irradiation spot beam-forming mask is formed by using a method comprising the processes of: forming a transmission metal oxide film layer on the transparent substrate by sputtering, forming a resist layer in a checkered pattern on the transmission metal oxide film layer of the transparent substrate by the microlithography method, and etching the transmission metal oxide film layer and removing the resist layer.

Furthermore, the high resolution optical microscope in accordance with the present invention can check a foreign matter on an object to be measured.

Even if a light beam is only throttled, the beam becomes a spot (Airy spot) on the order of a wavelength thereof because of Rayleigh's resolution limit, and hence the resolution of 0.1 μm can not be obtained.

In the present invention, a plurality of irradiation spot beams having a diameter smaller than that of an object to be measured are obtained by dividing the single light beam into the plurality of irradiation spot beams in a two-dimensional direction by the irradiation spot beam-forming mask in order to satisfy the following requirement necessary for achieving a high resolution of about 0.1 μm with a non-scanning type optical microscope. The requirement is that a diameter of the irradiation spot beam is reduced to equal to or less than a diameter of Airy spot, while the irradiation spot beam is irradiated on relatively an wide area of the object to be measured. The plurality of irradiation spot beams having the infinitesimal diameter are irradiated on the surface of the object through an optical system such as an objective lens or the like at a time. If the above mentioned irradiation spot beam-forming mask is made up of the prior art shield film, the small hole (in a pinhole shape) or the like, the plurality of irradiation spot beams have the same phase, and neighboring portions thereof overlap one another. Therefore, the plurality of the irradiation spot beams become a single spot on the surface of the object, and then it is impossible to obtain the complete separation of the spot.

To the contrary, in the irradiation spot beam-forming mask constituting the high resolution optical microscope according to the present invention, a phase arrangement, in which neighboring portions are optically phase-shifted from one another at 180°, is regularly arranged in a checkered pattern in the two-dimensional direction. Therefore, neighboring spot beams of the plurality of irradiation spot beams separated by the above mask are optically phase-shifted from one another at 180° and light intensity becomes zero in a central position where the neighboring spot beams overlap one another. As a result, complete separation of the plurality of irradiation spot beams can be realized to achieve a high resolution of under 0.1 μm.

Accordingly, in the high resolution optical microscope according to the present invention, a three-dimensional shape and dimensions of a tiny particle of 0.1 μm or less in length, can be measured. The conventional non-scanning optical type microscope can not measure this-sized fine object. Furthermore, the number and the position of the tiny particles can be also measured by image scanning thereof. The present invention also removes disadvantages and restrictions of the conventional scanning electron microscope, and the high resolution optical microscope of the present invention can measure a foreign matter and a shape of an object to be measured easily and promptly with keeping a resolution similar to that of the conventional scanning electron microscope.

Furthermore, the high resolution optical microscope of the present invention is applicable not only to a reflecting microscope but to a transmission type microscope.

According to the present invention, the following effects are obtained:

(1) Even if two coherent light spots optically phase-shifted from each other at 180° (the phase difference is 180°), approach each other as close as possible, the light intensity is zero in the central position of the overlapping potion of the spots and the spots are always recognized as two point sources ("Wave optics", by Hiroshi Kubota, Iwanami Shoten, 1971, on pp. 360–363). In the present invention, a mask such as a filter or a grating, in which the optically phase difference of two neighboring coherent light spots is 180°, is used for separating the irradiation spots. Thus, a high image resolution far higher than the Rayleigh's resolution limit which determines a resolution limit of the incoherent light beam, can be obtained. Moreover, since separated irradiation spots always become a plurality of point sources, a measurement in a remote field can be performed.

(2) A high resolution far beyond the Rayleigh's resolution limit according to a wavelength of each incident light beam can be obtained without using the short wavelength light. Usually, for example, a resolution of 0.1 μm or better can be obtained by using the short wavelength light (ultralviolet irradiation). According to the present invention, even if the long wavelength light is used, a resolution of 0.1 μm or better can be obtained.

(3) In the irradiation spot beam-forming mask of the present invention, since coherent irradiation light spots are disposed in a checkered pattern so that neighboring portions of the spots are optically phase-shifted from one another at 180° with the resolution between the spots which is far beyond Rayleigh's resolution limit, it can make the spot very small. Moreover, since a plurality of the spot lights extend in the two-dimensional direction, a wide observable surface and a prompt measurement can be achieved.

(4) Since a coherent visible light can be used as a light source and a wavelength of the usable light is not limited, an object to be measured can be measured not only in a vacuum but in air or in a liquid. Moreover, regardless of materials of the object to be measured, a living body etc. can be observed easily. For the same reason, the construction of the apparatus can be simplified, a small-sized and lightweight apparatus can be provided at a inexpensive cost, and is very practical.

(5) A measurement apparatus having the three-dimensional nanometer resolution can be realized by using means for varying an optical path length such as a piezo element.

(6) A shape of a single fine grain on the order of nanometers can be recognized on a reflecting surface only by disposing the irradiation spot beam-forming mask of the present invention in a dark field position.

The above and other objects, effects, features and advantages of the present invention will become more apparent from the following description of embodiments thereof taken in conjunction with the accompanying drawings.

BRIEF DESCRIPTION OF THE DRAWINGS

Embodiments of the present invention will now be by way of example, and with reference to the accompanying drawings in which.

DETAILED DESCRIPTION OF THE PREFERRED EMBODIMENTS

Figure 1:
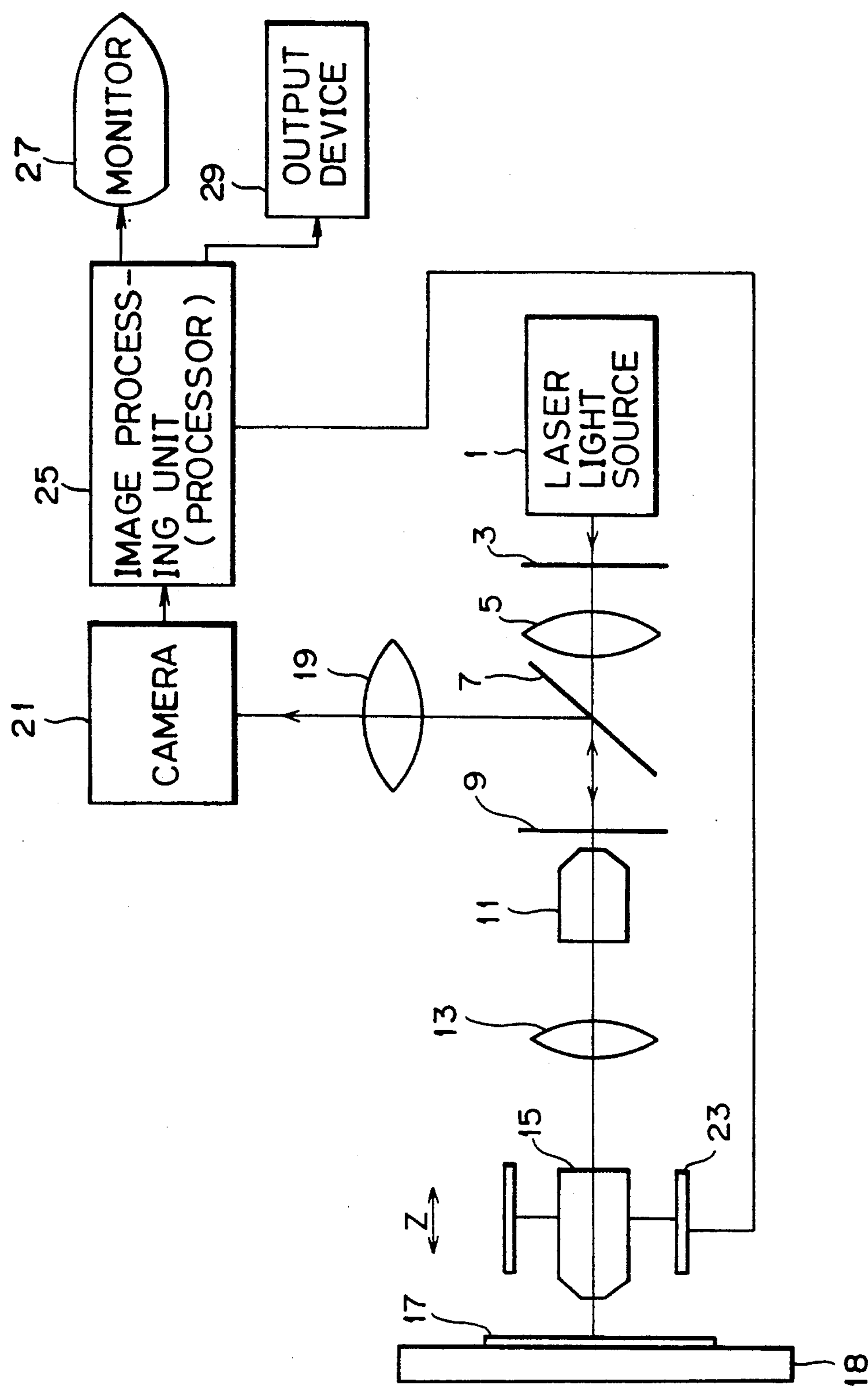
FIG. 1 is an optical path diagram showing a construction of a first embodiment in accordance with the present invention.

Throughout the following detailed description, similar reference numerals denote similar elements in all figures of drawings. The invention will now be described with reference to the accompanying drawings.

(i) First embodiment shown in FIG. 1 through FIG. 6

FIG. 1 shows a construction of the first embodiment of a high resolution optical microscope according to the present invention. This embodiment uses such a dark field method that an irradiation spot beam-forming mask used as an interference filter is placed on an optical path through which beams reciprocate, the reciprocating beams interfere each other so as to make a dark field. With reference to FIG. 1, a laser beam is produced by a laser light source 1, the noise in the laser beam is eliminated by a spatial filter 3, and the laser beam is made to be a parallel beam and a size thereof is adjusted by a collimator lens 5. After passing through a half mirror 7, the parallel beam is clearly divided into a plurality of irradiation spot beams whose each neighboring spot beam is optically phase-shifted from one another at 180° by an irradiation spot beam-forming mask 9 (hereinafter referred to as a phase shift filter), which has phase shifters arranged in a checkered pattern. The irradiation spot beam is magnified by a first objective lens 11, and then is focused by a focusing lens 13. After the irradiation spot beam is focused, a diameter of the irradiation spot beam is reduced to, e.g., 0.1 μm by a second objective lens 15 and the spot beams are illuminated onto a surface of a sample 17 to be measured on a stage 18.

In this case, the dark field is not obtained on the surface of the object, but is formed on a surface of view by phase interference. The irradiation spot beam being irradiated on a certain surface of the sample 17 to be measured, is reflected and passes through the second objective lens 15, the focusing lens 13, the first objective lens 11, and the phase shift filter 9, and then is connected to an incident beam on a surface of the phase shift filter 9 to generate an interference, by which the dark field is obtained. This dark field can be obtained not only by the interference on the surface of the phase shift filter 9 but also by an interference of the irradiation spot beams on a surface of an objective lens or the like. If a foreign matter is present on the surface of the object to be measured, it is seen that the foreign matter is bright in the dark field. The optical image of the foreign matter is reflected from the half mirror 7, is magnified by an eyepiece 19 and received by a camera 21. When an interference state on the surface of the phase shift filter 9 is adjusted by slightly moving the second objective lens 15, the dark field can be maintained and high contrast of the optical image can be obtained.

Though there is no restriction on a wavelength of a laser beam of the laser light source 1, the wavelength and output of the laser light source 1 must be stabilized. At present, for example, a gas laser such as a He-Ne laser is preferable. As an usable light wave, not only a visible ray but various electromagnetic waves such as infrared rays, ultraviolet rays and X rays, etc. may be usable as long as coherent rays can be generated. The spatial filter 3 consists of an objective lens and a pinhole or a slit and eliminates noises from the laser beam to produce a uniform phase beam. A beam splitter can be substituted for the half mirror 7. A contraction rate of the second objective lens 15 is, for example, 1/10 to 1/100. The second objective lens 15 slightly moves in the direction of the optical axis Z by means of a piezo vibrator 23 so as to expand and contract an optical path or optical path length to obtain longitudinal image data. For example, the sample 17 is an object such as a wafer of an LSI (large scale integrated circuit) or the like. The stage 18 for mounting the sample 17 can travel and can be scanned in the two-dimensional direction perpendicular to an optical axis, and can rotate to a desired angle if necessary. Furthermore, the stage 18 can move in the direction of the optical axis (longitudinal direction) when the sample 17 is set thereon.

As the camera 21, for example, an image sensor such as a solid state image pickup device using a CCD (charge coupled device) two-dimensional array and the like is suitable. Necessary image processing and analytical processing are performed on image signals outputted from the camera 21 in an image processing unit or processor 25 comprising a microcomputer and the like, and the result is displayed on a monitor or display unit 27. If necessary, the result is recorded by an output device 29 such as a printer.

Figure 2:
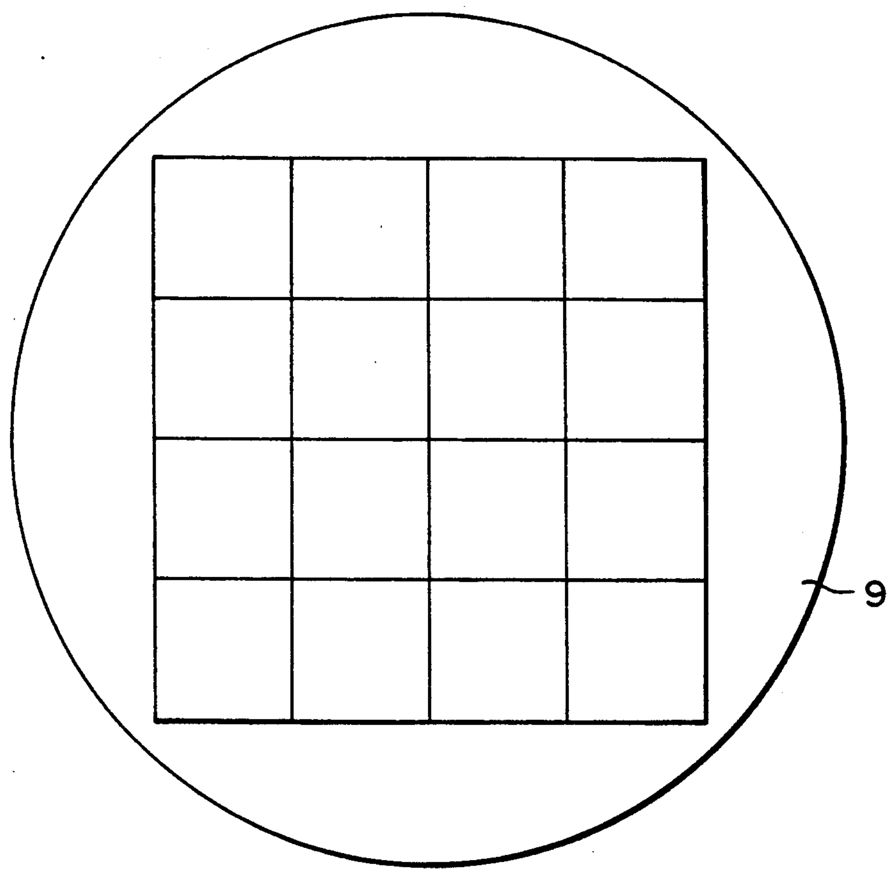
FIG. 2 is an enlarged plan view showing an example of an irradiation spot beam-forming mask of the present invention.
Figure 3A:
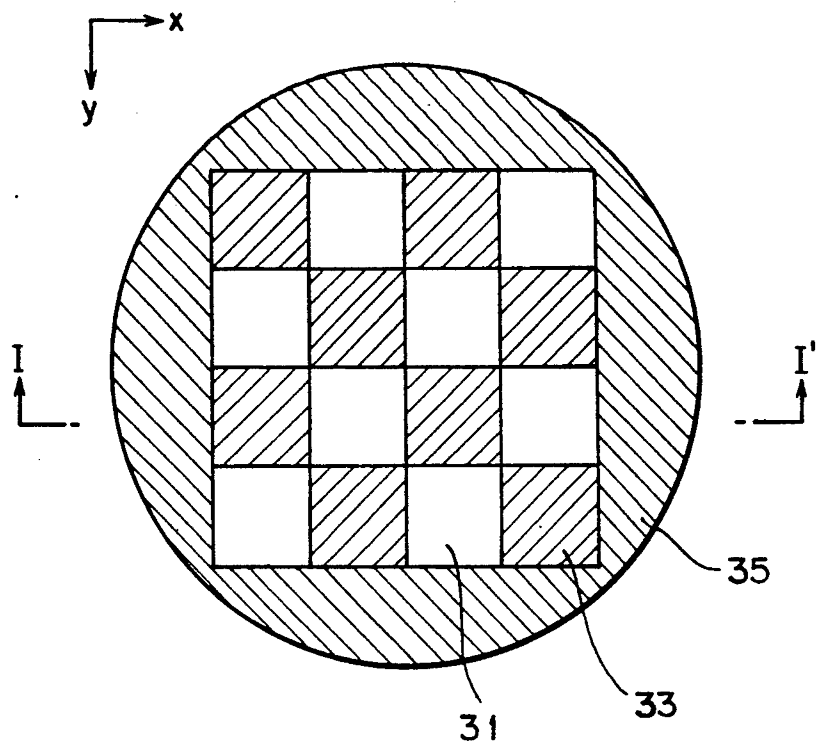
FIG. 3A is a plan view showing a detailed construction example of the irradiation spot beam-forming mask of 3 transmission type (a phase shift filter) of the present invention.
Figure 3B:
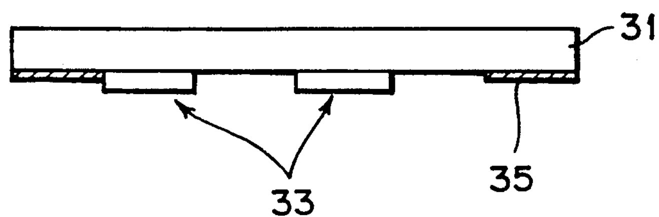
FIG. 3B is a longitudinal sectional view thereof taken along the line I—I' of FIG. 3A.

FIG. 2 shows an example of the external appearance of the above phase shift filter 9. FIGS. 3A and 3B are a plan view and a longitudinal sectional view of the detailed structure of the phase shift filter 9 shown in FIG. 2, respectively. As shown in these figures, the phase shift filter 9 is a grating-shaped phase plate. In the phase shift filter 9, a phase array, in which neighboring portions in the phase shift filter 9 are optically phase-shifted from one another at 180°, is regularly arranged in a checkered pattern in the two-dimensional direction. In FIGS. 2, 3A and 3B, the phase shift filter 9 having 4 μm-square cells is shown in a checkered pattern arrangement. As a substrate 31 constituting the phase shift filter 9, any materials are usable as long as they are transparent and have a high deviation from smoothness. For example, an optical glass plate is suitable because it is easy to handle. A transparent sensitive resin is applied on the substrate 31, and a plurality of phase shifters 33 can be produced on the substrate 31 in a checkered pattern by a micro-lithography method as shown in FIG. 3A. Each of the phase shifters 33 is a film to invert the optical phase. Instead of this, a tin oxide layer or the like is fabricated on the substrate 31 by a sputtering method, and a checkered resist pattern is turned out on the substrate 31 as well as in the above fabrication method, and then etching of the tin oxide layer or the like and removal of the resist layer are performed. As a result, a phase shift filter of inorganic shifter-inorganic substrate type can be obtained. It is very important to keep evenness and uniformity of the phase shift filter in the fabrication thereof.

In FIG. 3A, each of the phase shifters 33 is disposed in a hatched portion and is optically phase-shifted at 180° from a blank portion in this figure, where the substrate 31 is exposed. Each of the phase shifters 33 has a thickness according to the difference of the optical path lengths so as to be a half of the wavelength (0.5λ) of the laser beam so that each phase sifter 33 is phase-shifted optically from its neighboring blank portions at 180°. Specifically, the thickness of each of the phase shifters 33 is determined by not only the wavelength λ of the laser beam but also a refractive index of materials of the phase shifter 33, and a thickness and a refractive index of the substrate 31. For example, where a He-Ne laser beam of the wavelength λ of 633 nm is used, the substrate 31 is composed of optical glass of a thickness of 1 mm (its refractive index is 1.5), and materials of the phase shifter 33 are a transparent sensitive resin of a refractive index of 1.54, the thickness of each of the phase shifters 33 is determined to be about 0.59 μm. Reference numeral 35 denotes a shield or shade film for interrupting an unnecessary light beam, which is arranged on a periphery of the grating portion through which beams are transmitted.

The number of grating cells of the phase shift filter 9, which specifies the number of the irradiation spot beams, is not limited to that shown in FIG. 2. For example, a phase shift filter 9 having 500 ×500 of 4 μm square cells or more is preferable because the filter can cover a wide measurement range at a time, and this filter can be realized with ease by the micro-lithography method.

When the parallel laser beam is irradiated onto the phase shift filter 9 and the transmitted beams are converged by the objective lens 15 having a magnification of 40, the irradiation spot beams having an interval of 0.1 μm can be obtained and its lateral resolution of 0.1 μm far beyond the Rayleigh's resolution limit can be achieved. If the objective lens 15 of a magnification of 80 is used, the lateral resolution becomes 0.05 μm. The smaller is a size of the cell in the phase shift filter 9, the better is the resolution made and the higher is the resolution of a image made. For example, if the size of the cell changes from a 4 μm square to a 2 μm square, the lateral resolution becomes twice. Since, however, the quantity of light passing through one cell decreases by making the size of each cell small extremely, in practice the image resolution is limited naturally. The technique of fabricating and machining regarding precision production of flatness and uniformity restricts the image resolution. Consequently, the size of the cell of about 3 μm to 20 μm square is practical at present from a point of the manufacturing cost.

Figure 4:
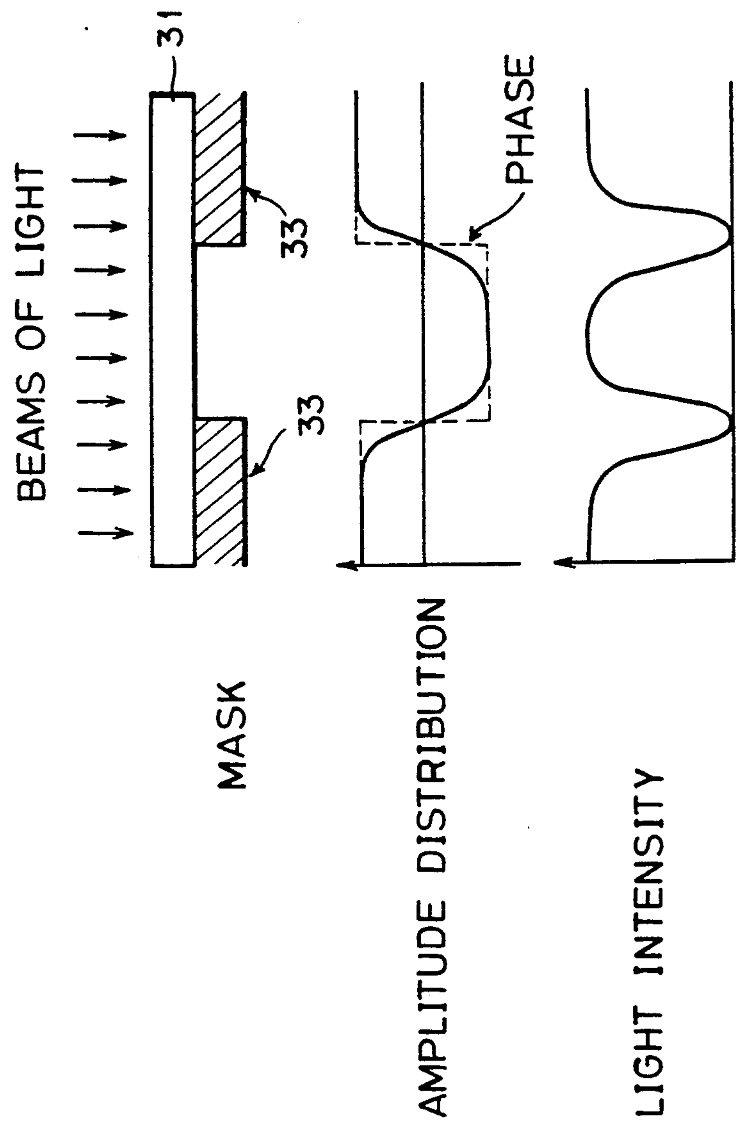
FIG. 4 is an explanatory diagram for explaining an effect of the irradiation spot beam-forming mask of the transmission type of the present invention.
Figures 5A, 5B, 5C:
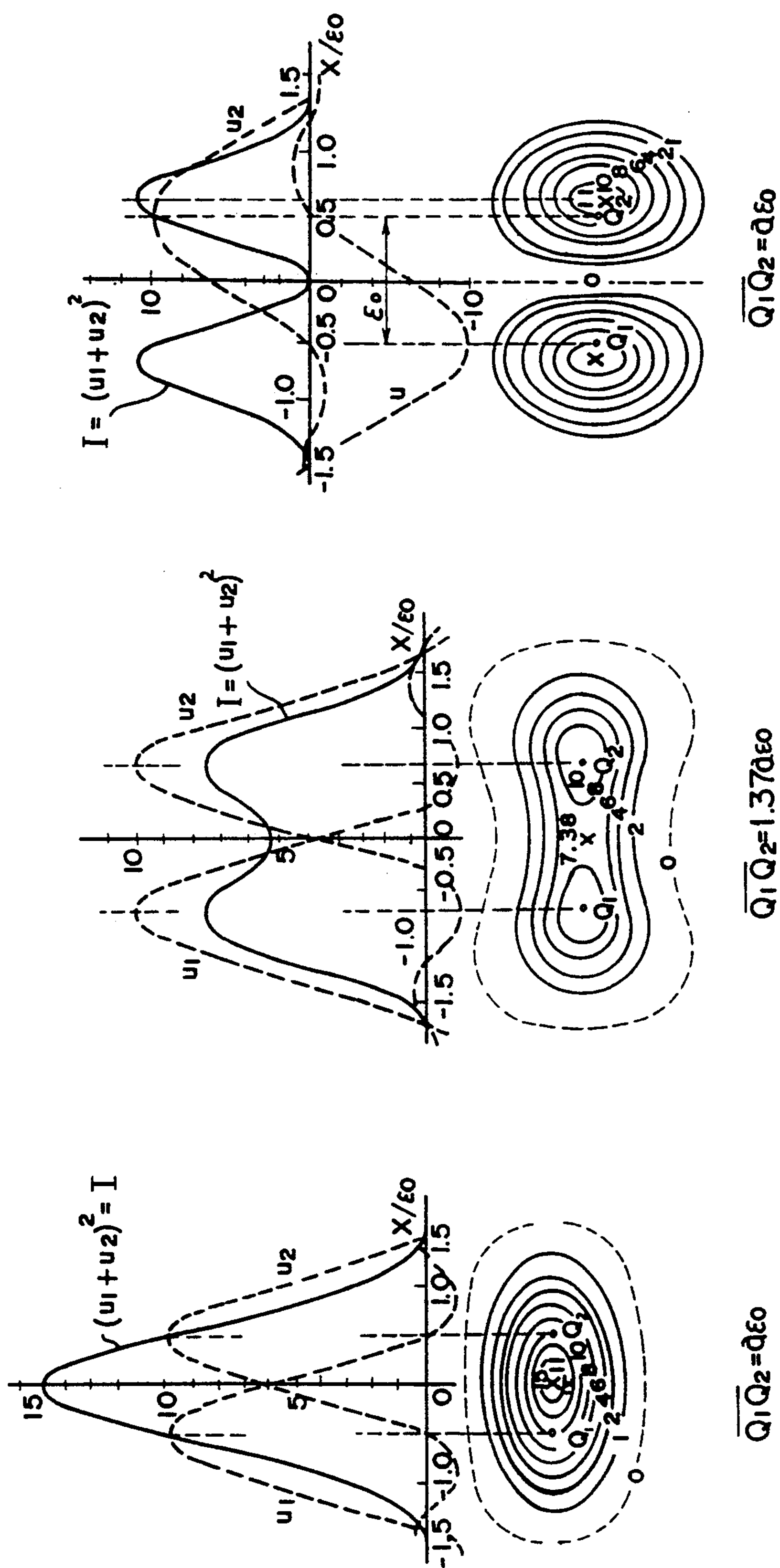
FIGS. 5A to 5C are waveform diagrams illustrating the principle of a function of the present invention.

FIG. 4 is a diagram showing an amplitude distribution and light intensity of the irradiation spot beam which has transmitted through the above phase shift filter 9 and arrived on the sample 17. FIG. 5C shows the principle of the effect. FIGS. 5A and 5B show Rayleigh's resolution limit of two coherent beams of the same phase. These figures will be explained below. Diffraction beams of a single beam having passed through a circular aperture become circular patterns having a concentric point, which is called Airy disk. When there are two point sources, each of the diffraction beams caused by the two point sources becomes Airy disk. If the two point sources are too close, the diffraction beams overlap each other and do not seem to be two beam points. Rayleigh has found the minimum distance at which the two beam points can be resolved and observed. The minimum distance is called the Rayleigh's resolution limit. In FIGS. 5A and 5B, when the two point sources have the same phase, the two beam points overlap each other as the two point sources approach each other. When the phase difference of the two point sources is 180° (shown in FIG. 5C) , the intensity of light is zero in a central position where the two point sources overlap each other and the diffraction beams are always recognized as two point light sources.

Since the phase shift filter 9 forms a pattern by using only the phase shifters, the phase of the beam is sharply inverted at an edge portion of the phase shifter 33 as shown in FIG. 4. Thus, only the edge portion is dark and consequently each of very fine irradiation spot beams of 0.1 μm diameter or less is clearly separated from one another along the edge of the phase shifter and is irradiated on the sample.

As described above, a luminous spot flux is composed of the combination of the interference light beams which are optically phase-shifted at 180° from one another. Consequently, the irradiation light system and the received light system can be placed in a distance field. Scattered light beams reflected from the sample 17 are captured in the distance field, and are magnified by the eyepiece 19. Image data of the magnified light beams are obtained as the light intensity corresponding to each address in a CCD two-dimensional array of the camera 21. Signals of the light intensity (image signals) are processed in the image processing unit 25, and consequently a magnified object image is displayed on a display screen of a monitor 27. When the irradiation spot beam having a diameter of 0.1 μm scans an object to be measured, a lateral resolution of 0.1 μm is obtained. When the second objective lens 15 is slightly moved in a direction of an optical axis Z by the piezo vibrator 23, a resolution of 0.1 μm in the optical axis direction is obtained.

Figure 6:
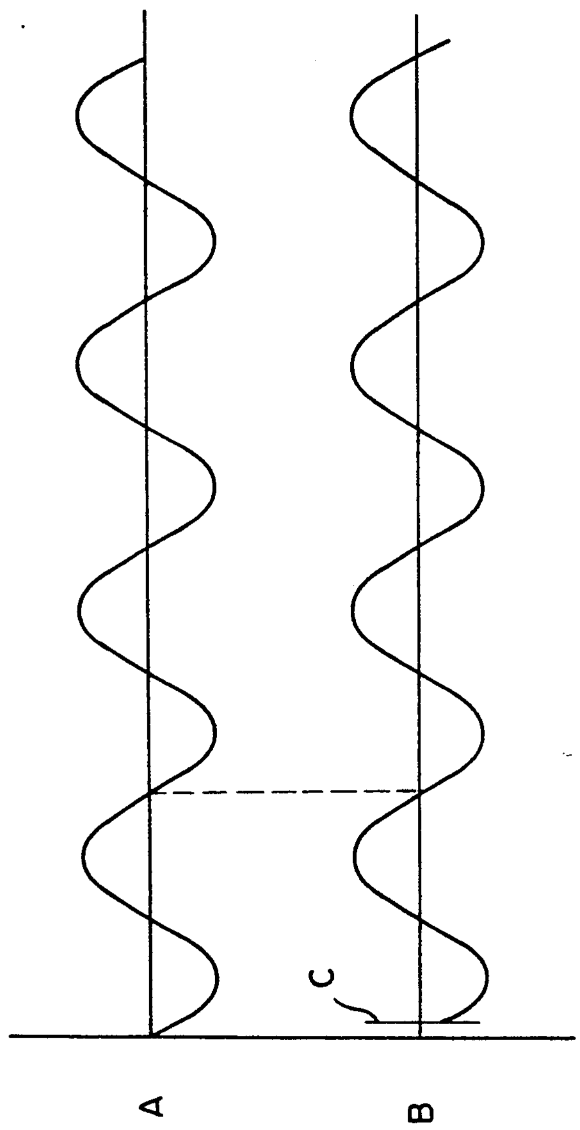
FIG. 6 is a waveform diagram illustrating the measurement principle of an object to be measured in the Z axis direction (an optical axis direction) in the first embodiment of the present invention shown in FIG. 1.

FIG. 6 illustrates a waveform of a light beam explaining the resolution in the direction of an optical axis Z. As shown in FIG. 6, reference character C shows a height of an object or sample from a standard surface or reference surface. If the height of the object from the standard surface is an optical path difference equal to or less than a half of a wavelength of the light beam and light interference is taken into consideration, the objective lens 15 has only to travel equal to or less than a half of the wavelength so that intensity of the interference light beam is minimized. The travel distance is given to the second objective lens 15 via the piezo vibrator 23 from a computer in the image processing unit 25, based on an amount of feed-back image data inputted from the camera 21. The travel distance obtained when intensity of the interference light beam is minimized (black), becomes a distance (height) of the object in the direction of an optical axis Z. As a usable processing apparatus which produces numerical data of three-dimensional data of a surface to be measured, for example, a computer for control and analysis (HP9000/335,360) can be used, which is manufactured by Zygo Co., Ltd and is used for a noncontact three-dimensional surface roughness detector. When this processing apparatus put on the market is used, three-dimensional measurement values of the object can be obtained with ease by the N basket method. The N basket method is as follows: The interference intensity on each pixel in the camera is changed by vibrating the piezo vibrator in the optical path direction, and signal waves are obtained from the camera and the signal waves of one theoretical cycle are divided into a plurality N of areas and the signal intensity typical of each of the areas is read out and the phase of the signal waves is calculated with the intensity data.

In the first embodiment shown in FIG. 1, the piezo vibrator 23 is attached to the second objective lens 15. For another example, the piezo vibrator 23 can be also attached to the first objective lens 11 or the phase shift filter 9. Other magnetostriction elements can be used instead of the above piezo vibrator.

Moreover, a whole surface of an object to be measured can be scanned by moving the stage 18 shown in FIG. 1 in the two-dimensional direction. Even if the object 17 is a wafer having a pattern or the like, a foreign matter can be measured by moving the stage in the two-dimensional direction. Thus, the first embodiment of the high resolution optical microscope system according to the present invention has a resolution as high as that of the conventional scanning electron microscope and can measure a foreign matter whose size is equal to or less than the light beam wavelength easily and rapidly, and hence is provided as a surface foreign matter checking apparatus with high performance and at low cost.

Figure 7:
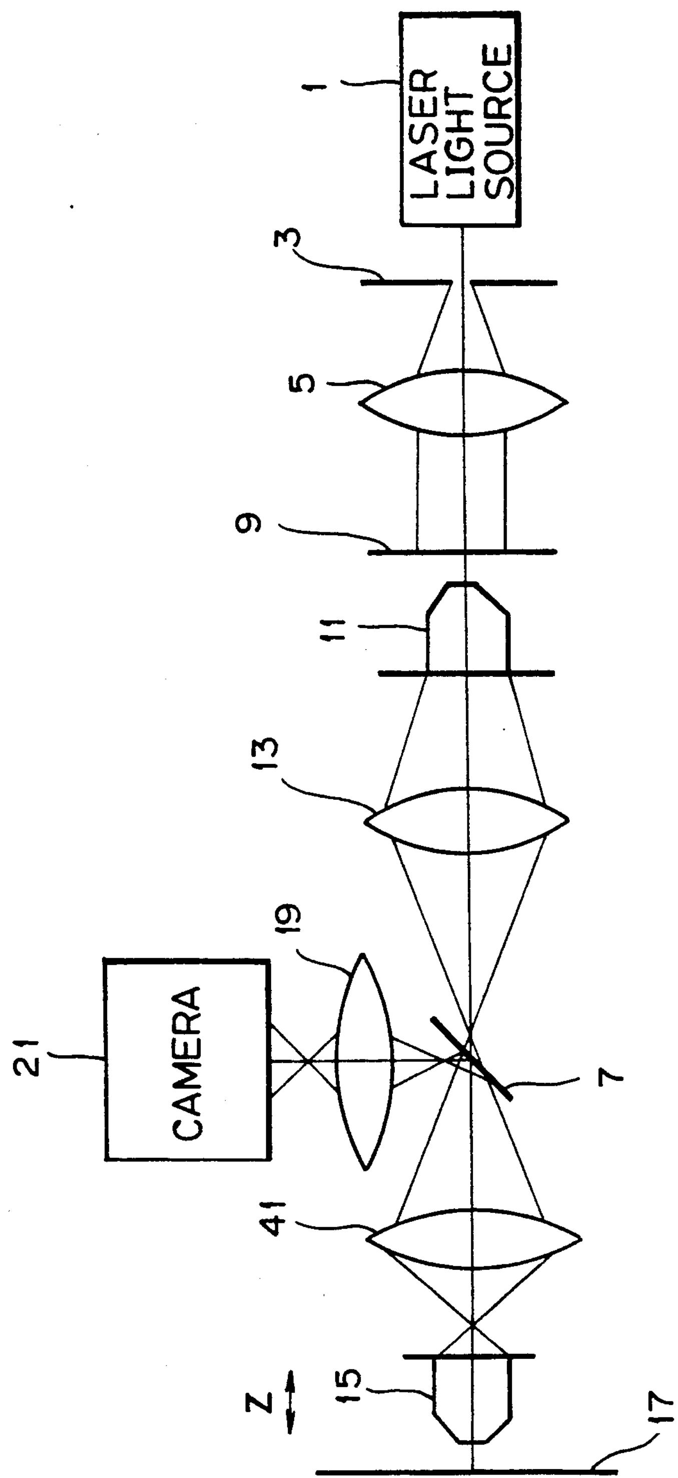
FIG. 7 is an optical path diagram showing a construction of a second embodiment of the present invention.

(ii) Second embodiment shown in FIG. 7

FIG. 7 shows a construction of the second embodiment of a high resolution optical microscope according to the present invention. As shown in FIG. 7, similar reference numerals denote similar parts of the first embodiment shown in FIG. 1. Reference numeral 41 denotes a lens for adjusting an aperture. Moreover, the stage 18, the piezo vibrator 23, the image processing unit 25, the monitor 27 and the output device 29 shown in FIG. 1 are not shown in FIG. 7 for the sake of simplification.

In the second embodiment, the present invention is applied to the bright field method. The irradiation spot beam-forming mask or phase shift filter 9 is disposed in an upstream of the optical path, with respect to the half mirror 7, through which the light beam passes only once, and is used as a phase shift filter. The bright field method will be explained below. Even though the light beam is converged extremely, the size of the light beam becomes at most wavelength thereof. This is called Airy disk as described above shown in FIGS. 5A to 5C. When the two Airy disks approach each other, the two disks become a single light spot connectedly in the case where the two light beams are incoherent beams or coherent beams having same phase. However, when the two light beams are a coherent beam having an antiphase from each other, a portion of the light intensity zero is generated on a midway of an optical path even if both the light beams approach each other as close as possible (see FIG. 5C). When this state is spread in both longitudinal and lateral directions, two-dimensional light spots can be observed. Therefore, when gratings of the phase shift filter 9 are present in the Airy disk, a resolution for resolving a size equal to or less than the wavelength in a two-dimensional surface can be achieved.

As shown in FIG. 1, in the optical microscope, the laser source 1, the spatial filter 3, the collimator lens 5, the phase shift filter or irradiation spot beam-forming mask 9, the first objective lens 11, the focusing lens 13, the half mirror 7, an lens 41 for adjusting an aperture (hereinafter referred to as an aperture lens) and the second objective lens 15 are arranged in this order. The second objective lens 15 faces the sample 17 on the stage 18. Beams reflected from the sample 17 returns to the second objective lens 15, and pass through the lens 15 and the aperture lens 41. Then, the beams are reflected and deflected by the half mirror 7, are magnified by the eyepiece 19, and are received by the camera 21. When the collimator lens 5 and the focusing lens 13 are adjusted preferably, the aperture lens 41 is not necessarily required. However, when the aperture lens 41 is used, an aperture can be easily adjusted.

In the second embodiment, since the phase shift filter 9 is placed in a bright field, an image received by the camera 21 is observed in a bright field like the general optical microscope. In the measurement of the sample 17 in the direction of the optical axis Z, the second objective lens 15 or the first objective lens 11 is slightly vibrated with equal to or less than a half of the wavelength in the direction of the optical path Z by the piezo vibrator 23 like the first embodiment shown in FIG. 1. As a result, a three-dimensional measurement of the sample 17 can be easily and promptly performed in the bright field with a high resolution of equal to or less than 0.1 μm.

Figure 8:
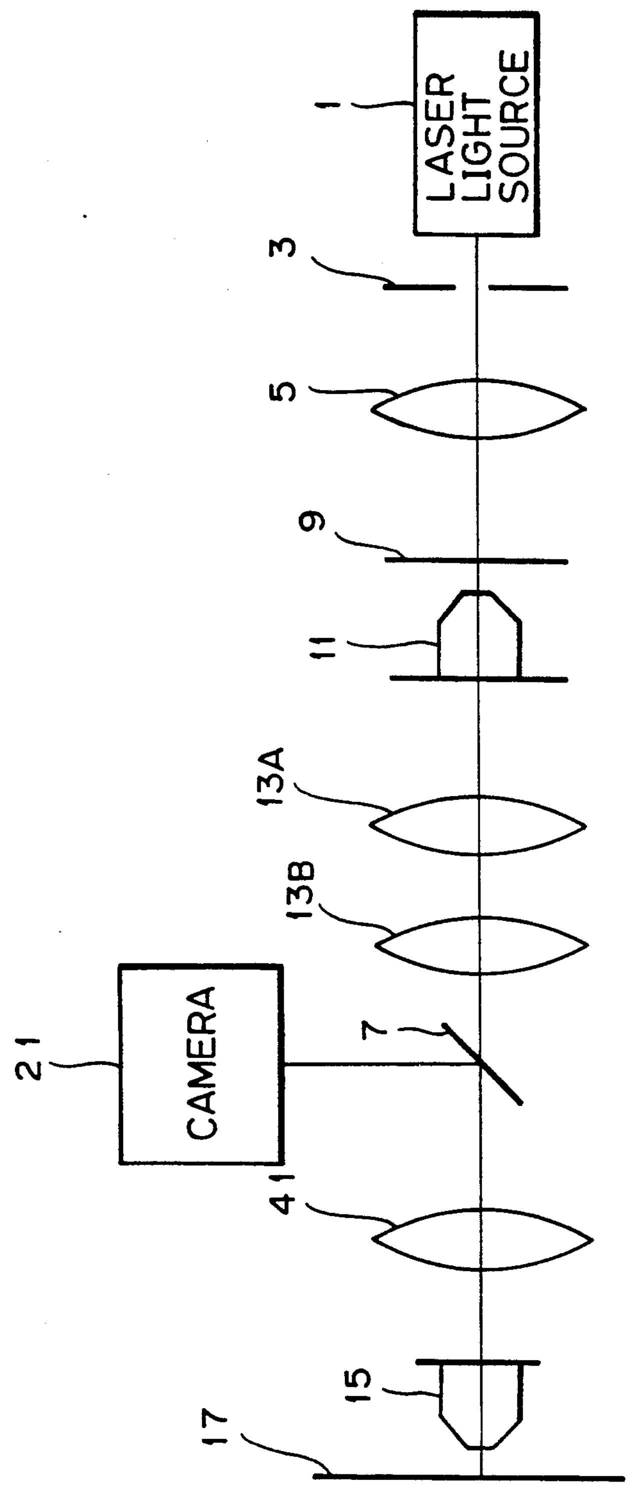
FIG. 8 is an optical path diagram showing a construction of a third embodiment of the present invention.

(iii) Third embodiment shown in FIG. 8

FIG. 8 shows a construction of the third embodiment of a high resolution optical microscope according to the present invention. This embodiment is another example to which the bright field method is applied like the second embodiment shown in FIG. 7. Unlike the second embodiment, the above focusing lens is replaced by a pair of lens 13A and lens 13B which are composed as a zoom lens, and the eyepiece ahead of the camera 21 is removed. Because other constructions and effects of the third embodiment are similar to those of the second embodiment, the explanation of the third embodiment is omitted.

Figure 9A:
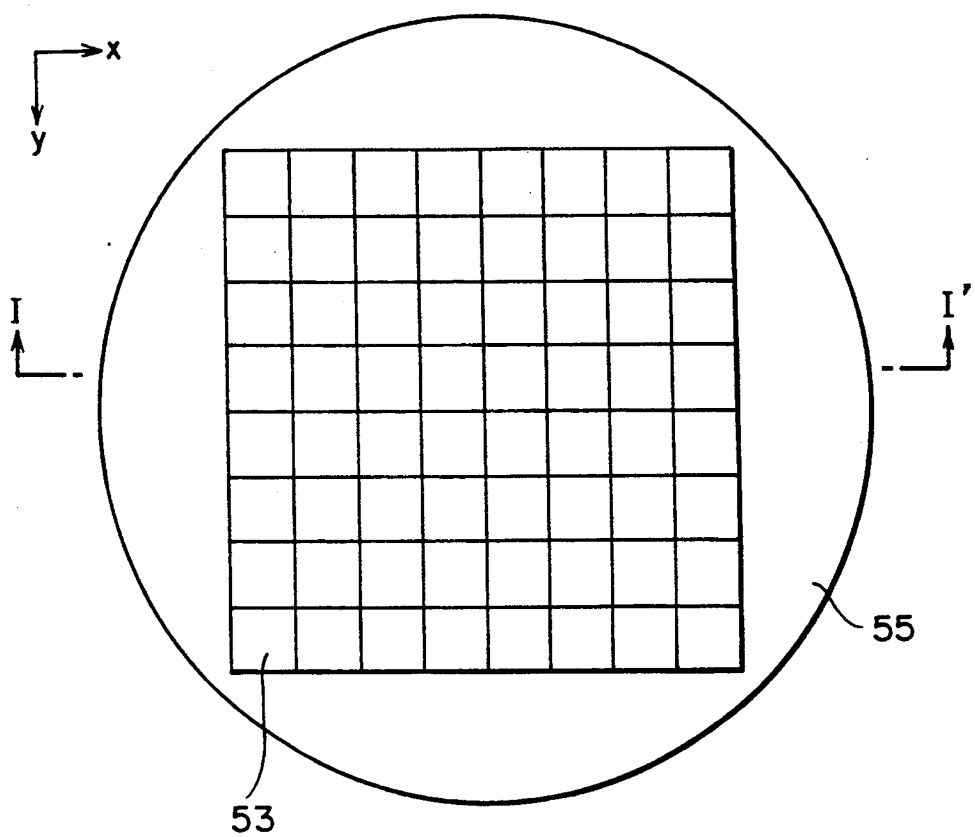
FIG. 9A is a plan view showing a detailed construction example of the irradiation spot beam-forming mask (grating) of a reflection type of the present invention.
Figure 9B:
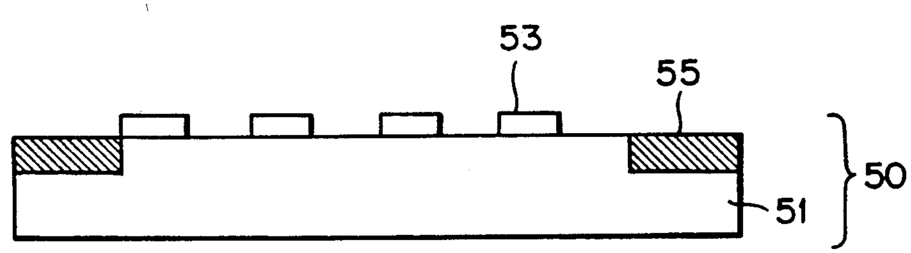
FIG. 9B is a longitudinal and sectional view thereof taken along the line I-I'.

(iv) Fourth embodiment shown in FIGS. 9A and 9B

The above embodiments of the present invention are provided with the transmission type irradiation spot beam-forming mask. However, the present invention is not limited thereto, and a mask of a reflection type for forming irradiation spot beams can be also applied to the present invention.

FIGS. 9A and 9B show an example of the reflection type irradiation spot beam-forming mask. Reference numerals 51, 53 and 55 denote a substrate whose surface totally reflects spot beams, a phase shifter whose surface totally reflects spot beams and an antireflection film which prevents reflection from an unnecessary area, respectively. The phase shifter 53 is disposed on the substrate 51 in a checkered pattern like the above transmission type irradiation spot beam-forming mask 9. Each phase shifter 53 is fabricated in a 4 $\mu$m square shape and the thickness thereof is a quarter of the wavelength of the used laser beam. For example, if the laser beam of a wavelength of 633 nm is used, the thickness of the phase shifter 53 becomes 0.158 $\mu$m. In this case, since one phase shifter 53 is optically phase-shifted from neighboring portions (51) thereof at 180°, nullary beams are only emphasized to become reflected spot beams. Primary beams or minus primary order beams and the like are cancelled from each other. As a result, the reflection type irradiation spot beam-forming mask 50 operates like the mask 9 of a transmission type.

The substrate 51 for reflecting spot beams is made of not only metallic materials but metal plated or metal sputtered glass plate or the like. In this case, the phase shifters 53 can be fabricated by using the etching method, the metal plating method, the sputtering method or the like. The irradiation spot beam-forming mask or phase grating 50 of the reflection type can be substituted for the transmission type irradiation spot beam-forming mask 9 shown in FIGS. 1, 7 and 8 by combining the above mask 50 with an appropriate well known deflection optical system (for example, a cubic mirror or the like). Consequently, in the mask of the reflection type, the same effects and advantages can be obtained like the mask of the transmission type.

A light source of the optical microscope of the present invention is not limited to visible rays. Other coherent electromagnetic waves are applicable to the light source of the optical microscope of the present invention. Furthermore, the high resolution optical microscope of the present invention is usable not only as a reflecting optical microscope but as a transmitting optical microscope by which an object to be measured is observed with the light beam transmitted through it.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A high resolution optical microscope comprising:
means for forming an irradiation spot beam in such a way that a phase arrangement is regularly arranged in the two-dimensional direction so that each of neighboring portions of a plurality of coherent irradiation spot beams for irradiating onto an object to be measured is optically phase-shifted from one another at 180°; and
means for converging said plurality of coherent irradiation spot beams so that a diameter of each of said plurality of coherent irradiation spot beams is made smaller than a size of said object and for illuminating said object by said plurality of converged irradiation spot beams.

2. A high resolution optical microscope as claimed in claim 1, wherein said means for forming an irradiation spot beam comprises:
a light source for generating a coherent light beam; and
an irradiation spot beam-forming mask which forms said plurality of irradiation spot beams by transmitting or reflecting said coherent light beam and is regularly arranged in the two-dimensional direction so that each of neighboring portions of said plurality of coherent irradiation spot beams is optically phase-shifted from one another at 180°.

3. A high resolution optical microscope as claimed in claim 2, wherein said irradiation spot beam-forming mask is disposed either in a bright field position in which one or more beams pass only once or in a dark field position in which the same one or more beams pass twice.

4. A high resolution optical microscope as claimed in claim 2, wherein said irradiation spot beam-forming mask is disposed either in a upstream or in a downstream of a half mirror or a beam splitter being placed on an optical path, with respect to said light source, and said object is mounted on a stage which can travel for scanning in the two-dimensional direction or in the three-dimensional direction.

5. A high resolution optical microscope as claimed in claim 1, wherein said converging and illuminating means is a lens system.

6. A high resolution optical microscope as claimed in claim 5, further comprising minimum shifting means for slightly moving or vibrating said lens system in a direction of the optical axis of said lens system.

7. A high resolution optical microscope as claimed in claim 6, further comprising:
photoelectric transducing means for transducing reflected light beams from said object via said lens system into image signals; and
surface foreign matter checking means for processing said image signals and for checking one or more foreign matters on said object.

* * * * *